US012810849B2

United States Patent

(12) United States Patent
Bhathena et al.

(10) Patent No.: US 12,810,849 B2
(45) Date of Patent: Nov. 24, 2026

(54) METHOD AND SYSTEM FOR CONDITIONAL HIERARCHICAL DOMAIN ROUTING AND INTENT CLASSIFICATION FOR VIRTUAL ASSISTANT QUERIES

(71) Applicant: JPMorgan Chase Bank, N.A., New York, NY (US)

(72) Inventors: Hanoz Bhathena, New York, NY (US); Tianyu Ma, Jersey City, NJ (US); Denis Kochedykov, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 209 days.

(21) Appl. No.: 18/437,631

(22) Filed: Feb. 9, 2024

(65) Prior Publication Data

US 2024/0282296 A1 Aug. 22, 2024

Related U.S. Application Data

(60) Provisional application No. 63/446,134, filed on Feb. 16, 2023.

(51) Int. Cl.

| | |
|---|---|
| ***G10L 15/18*** | (2013.01) |
| ***G06F 40/58*** | (2020.01) |
| ***G10L 15/06*** | (2013.01) |
| ***G10L 15/22*** | (2006.01) |
| ***G10L 15/30*** | (2013.01) |
| *G06Q 20/30* | (2012.01) |

(52) U.S. Cl.
CPC .......... *G10L 15/1815* (2013.01); *G06F 40/58* (2020.01); *G10L 15/063* (2013.01); *G10L 15/22* (2013.01); *G10L 15/30* (2013.01); *G06Q 20/30* (2013.01)

(58) Field of Classification Search
USPC ................................ 704/2–7, 231, 257, 275
See application file for complete search history.

(56) References Cited

U.S. PATENT DOCUMENTS

| | | | | |
|---|---|---|---|---|
| 11,423,451 | B1 * | 8/2022 | Chaudhari | G06F 16/638 |
| 2020/0310888 | A1 * | 10/2020 | Gopalan | G06F 21/31 |
| 2021/0303798 | A1 * | 9/2021 | Duong | G06F 40/35 |
| 2022/0100961 | A1 * | 3/2022 | Vishnoi | G06F 40/35 |
| 2022/0101839 | A1 * | 3/2022 | George | G06N 5/02 |
| 2022/0171946 | A1 * | 6/2022 | Xu | G06N 3/0985 |

* cited by examiner

*Primary Examiner* — Leonard Saint-Cyr
(74) *Attorney, Agent, or Firm* — GREENBLUM & BERNSTEIN, P.L.C.

(57) ABSTRACT

A system and a method for performing hierarchical domain routing and intent classification on user queries in order to improve accuracy in responding to such queries and to create smoother conversations between virtual voice assistants and users are provided. The method includes: receiving an utterance from a user; analyzing the utterance in order to make an initial determination of user intent and a confidence level that relates thereto; when the confidence level is less than a threshold, applying an artificial intelligence (AI) model that is configured to assign the received utterance to one or more domains; outputting, based on the assigned domain(s), information that prompts the user to provide additional input that relates to the user intent; receiving the additional input; and secondarily determining, based on the additional input, the user intent.

18 Claims, 6 Drawing Sheets

400

500

600

METHOD AND SYSTEM FOR CONDITIONAL HIERARCHICAL DOMAIN ROUTING AND INTENT CLASSIFICATION FOR VIRTUAL ASSISTANT QUERIES

CROSS-REFERENCE TO RELATED APPLICATIONS

This application claims the benefit of U.S. Provisional Patent Application Ser. No. 63/446,134, filed Feb. 16, 2023, which is hereby incorporated by reference in its entirety.

BACKGROUND

1. Field of the Disclosure

This technology generally relates to methods and systems for using virtual voice assistants to respond to user queries, and more particularly to methods and systems for performing hierarchical domain routing and intent classification on user queries in order to improve accuracy in responding to such queries and to create smoother conversations between virtual voice assistants and users.

2. Background Information

A task-oriented dialogue system, also referred to as a conversational agent or virtual assistant (VA), is designed to communicate with humans and perform specific tasks in defined domains. The goal is to automate previously manual tasks, thereby reducing the workload and potential for errors while enhancing efficiency.

Task-oriented dialogue systems are becoming increasingly popular, as seen in various industries and applications such as online shopping, education, and healthcare, etc. Unlike open-domain dialogue systems, task-oriented dialogue systems typically have more well-defined use cases and scenarios. This requires more domain knowledge and a specific set of intents and slots/entities in order to accomplish specific tasks. Open-domain dialogue systems, on the other hand, are designed to have a broader scope and engage in more open-ended conversations with users.

There are two main approaches for modern task-oriented dialogues systems: a pipeline approach and an end-to-end approach. The end-to-end approach utilizes a single model that directly processes natural language input and produces a response. Conversely, the pipeline approach breaks the system down into separate modules, such as natural language understanding (NLU), dialog state tracking (DST), dialog policy (Policy), and natural language generation (NLG). In industry settings, the pipeline approach is favored as it enables different teams to develop, test, and optimize each module separately, thereby allowing for better error analysis by tracing problems to specific components.

Accordingly, there is a need for systems and methods for performing hierarchical domain routing and intent classification on user queries in order to improve accuracy in responding to such queries and to create smoother conversations between virtual voice assistants and users.

SUMMARY

The present disclosure, through one or more of its various aspects, embodiments, and/or specific features or sub-components, provides, inter alia, various systems, servers, devices, methods, media, programs, and platforms for performing hierarchical domain routing and intent classification on user queries in order to improve accuracy in responding to such queries and to create smoother conversations between virtual voice assistants and users.

According to an aspect of the present disclosure, a method for using a virtual assistant to respond to a request of a user is provided. The method includes: receiving, by the at least one processor, an utterance from the user; analyzing, by the at least one processor, the received utterance in order to make an initial determination of an intent of the user and a confidence level that relates to the initial determination of the intent; when the confidence level is less than a predetermined threshold, applying, to the received utterance by the at least one processor, an artificial intelligence (AI) model that is configured to assign the received utterance to at least one domain from among a predetermined plurality of domains; outputting, by the at least one processor based on the at least one domain to which the received utterance is assigned, information that prompts the user to provide additional input that relates to the intent of the user; receiving, by the at least one processor from the user, the additional input; and secondarily determining, by the at least one processor based on the additional input, the intent of the user.

The outputting of the information may include displaying, to the user, a respective predetermined list of items that corresponds to possible intentions associated with the at least one domain to which the received utterance is assigned.

The predetermined plurality of domains may include a first domain group that relates to products associated with a financial institution and a second domain group that relates to activity associated with the financial institution.

The first domain group may include a first domain that relates to Zelle®, a second domain that relates to a bill payment product, a third domain that relates to a deposit making product, a fourth domain that relates to a card, and a fifth domain that relates to a wire transfer product.

The second domain group may include a sixth domain that relates to a money transfer activity, a seventh domain that relates to a payee management activity, and an eighth domain that relates to a transaction tracking activity.

The AI model may be trained by using historical utterance data that is augmented by using a keyboard perturbation technique that relates to randomly replacing characters within words with neighboring characters on a keyboard.

The AI model may be trained by using historical utterance data that is augmented by using a swapping character perturbation technique that relates to randomly swapping characters within a word while maintaining word length.

The AI model may be trained by using historical utterance data that is augmented by using a back-translation process that relates to translating a respective utterance from English to at least one from among French and German and then translating the translated respective utterance back to English.

The AI model may be trained by using historical utterance data that is augmented by using a paraphrasing process that relates to generating, for a respective utterance, at least one additional example utterance that is different from the respective utterance while maintaining an original intent that is associated with the respective utterance.

According to another exemplary embodiment, a computing apparatus for using a virtual assistant to respond to a request of a user is provided. The computing apparatus includes a processor; a memory; and a communication interface coupled to each of the processor and the memory. The processor is configured to: receive, via the communication interface, an utterance from the user; analyze the received utterance in order to make an initial determination of an intent of the user and a confidence level that relates to the initial determination of the intent; when the confidence level is less than a predetermined threshold, apply, to the received utterance, an artificial intelligence (AI) model that is configured to assign the received utterance to at least one domain from among a predetermined plurality of domains; output, based on the at least one domain to which the received utterance is assigned, first information that prompts the user to provide additional input that relates to the intent of the user; receive, from the user via the communication interface, the additional input; and secondarily determine, based on the additional input, the intent of the user.

The processor may be further configured to perform the outputting of the information by displaying, to the user, a respective predetermined list of items that corresponds to possible intentions associated with the at least one domain to which the received utterance is assigned.

The predetermined plurality of domains may include a first domain group that relates to products associated with a financial institution and a second domain group that relates to activity associated with the financial institution.

The first domain group may include a first domain that relates to Zelle®, a second domain that relates to a bill payment product, a third domain that relates to a deposit making product, a fourth domain that relates to a card, and a fifth domain that relates to a wire transfer product.

The second domain group may include a sixth domain that relates to a money transfer activity, a seventh domain that relates to a payee management activity, and an eighth domain that relates to a transaction tracking activity.

The AI model may be trained by using historical utterance data that is augmented by using a keyboard perturbation technique that relates to randomly replacing characters within words with neighboring characters on a keyboard.

The AI model may be trained by using historical utterance data that is augmented by using a swapping character perturbation technique that relates to randomly swapping characters within a word while maintaining word length.

The AI model may be trained by using historical utterance data that is augmented by using a back-translation process that relates to translating a respective utterance from English to at least one from among French and German and then translating the translated respective utterance back to English.

The AI model may be trained by using historical utterance data that is augmented by using a paraphrasing process that relates to generating, for a respective utterance, at least one additional example utterance that is different from the respective utterance while maintaining an original intent that is associated with the respective utterance.

According to yet another exemplary embodiment, a non-transitory computer readable storage medium storing instructions for using a virtual assistant to respond to a request of a user is provided. The storage medium includes executable code which, when executed by a processor, causes the processor to: receive an utterance from the user; analyze the received utterance in order to make an initial determination of an intent of the user and a confidence level that relates to the initial determination of the intent; when the confidence level is less than a predetermined threshold, apply, to the received utterance, an artificial intelligence (AI) model that is configured to assign the received utterance to at least one domain from among a predetermined plurality of domains; output, based on the at least one domain to which the received utterance is assigned, information that prompts the user to provide additional input that relates to the intent of the user; receive, from the user, the additional input; and secondarily determine, based on the additional input, the intent of the user.

When executed, the executable code may further cause the processor to display, to the user, a respective predetermined list of items that corresponds to possible intentions associated with the at least one domain to which the received utterance is assigned.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
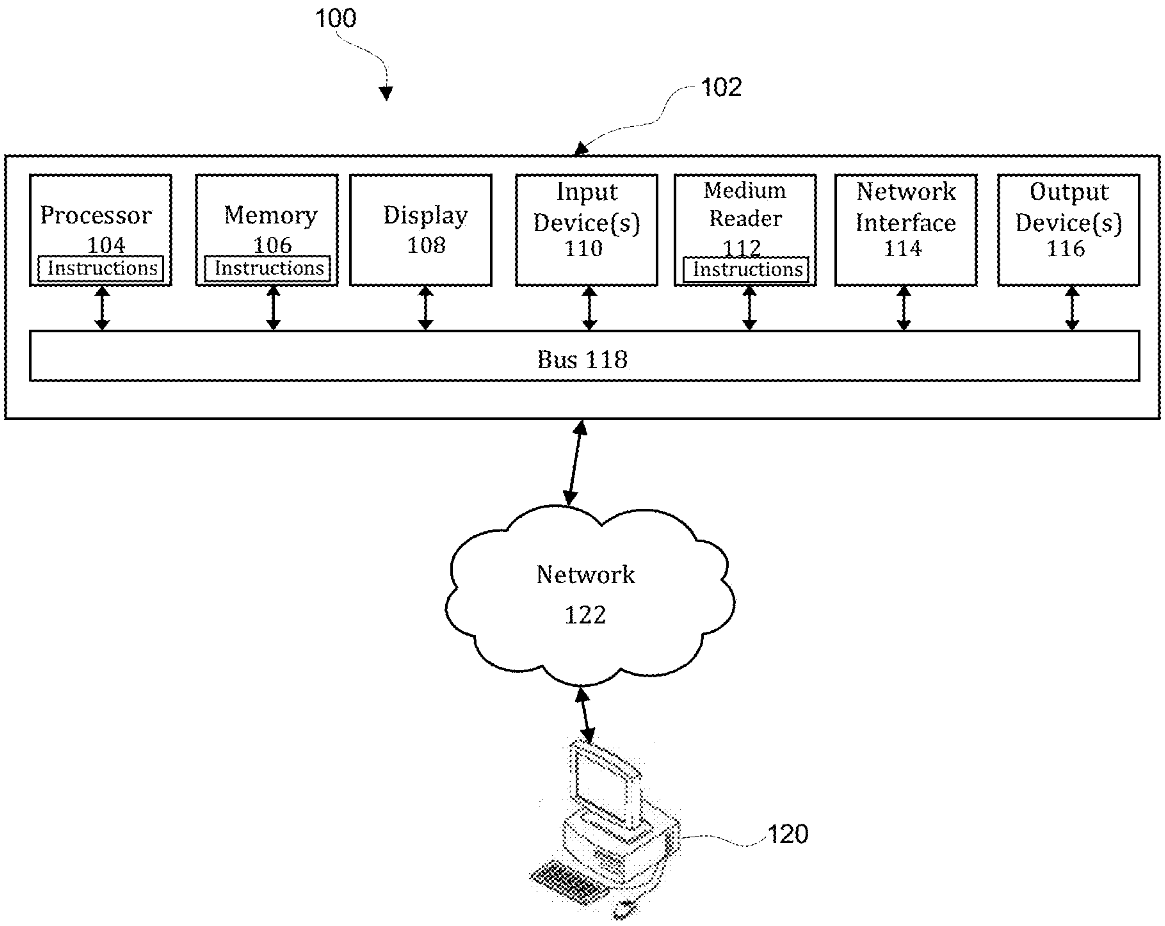
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for performing hierarchical domain routing and intent classification on user queries in order to improve accuracy in responding to such queries and to create smoother conversations between virtual voice assistants and users.

Figure 2:
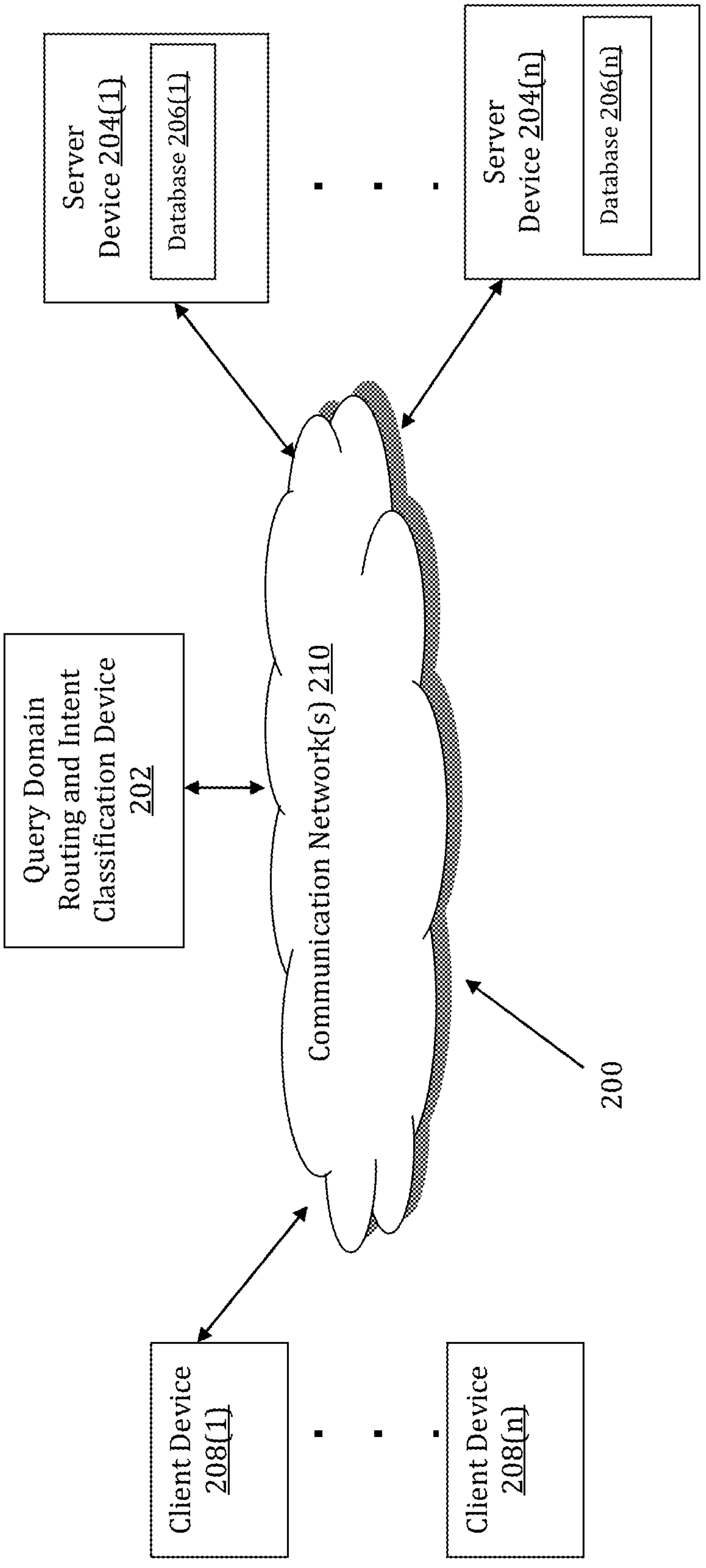
FIG. 2 illustrates an exemplary diagram of a network environment.

Referring to FIG. 2, a schematic of an exemplary network environment 200 for implementing a method for performing hierarchical domain routing and intent classification on user queries in order to improve accuracy in responding to such queries and to create smoother conversations between virtual voice assistants and users is illustrated. In an exemplary embodiment, the method is executable on any networked computer platform, such as, for example, a personal computer (PC).

The method for performing hierarchical domain routing and intent classification on user queries in order to improve accuracy in responding to such queries and to create smoother conversations between virtual voice assistants and users may be implemented by a Query Domain Routing and Intent Classification (QDRIC) device 202. The QDRIC device 202 may be the same or similar to the computer system 102 as described with respect to FIG. 1. The QDRIC device 202 may store one or more applications that can include executable instructions that, when executed by the QDRIC device 202, cause the QDRIC device 202 to perform actions, such as to transmit, receive, or otherwise process network messages, for example, and to perform other actions described and illustrated below with reference to the figures. The application(s) may be implemented as modules or components of other applications. Further, the application (s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the QDRIC device 202 itself, may be located in virtual server(s) running in a cloud-based computing environment rather than being tied to one or more specific physical network computing devices. Also, the application(s) may be running in one or more virtual machines (VMs) executing on the QDRIC device 202. Additionally, in one or more embodiments of this technology, virtual machine(s) running on the QDRIC device 202 may be managed or supervised by a hypervisor.

In the network environment 200 of FIG. 2, the QDRIC device 202 is coupled to a plurality of server devices 204(1)-204(*n*) that hosts a plurality of databases 206(1)-206 (*n*), and also to a plurality of client devices 208(1)-208(*n*) via communication network(s) 210. A communication interface of the QDRIC device 202, such as the network interface 114 of the computer system 102 of FIG. 1, operatively couples and communicates between the QDRIC device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the QDRIC device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and QDRIC devices that efficiently implement a method for performing hierarchical domain routing and intent classification on user queries in order to improve accuracy in responding to such queries and to create smoother conversations between virtual voice assistants and users.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The QDRIC device 202 may be a standalone device or integrated with one or more other devices or apparatuses, such as one or more of the server devices 204(1)-204(*n*), for example. In one particular example, the QDRIC device 202 may include or be hosted by one of the server devices 204(1)-204(*n*), and other arrangements are also possible. Moreover, one or more of the devices of the QDRIC device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the QDRIC device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store various types of information.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the QDRIC device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the QDRIC device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the QDRIC device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the QDRIC device 202, the server devices 204(1)-204(*n*), or the client devices 208(1)-208(*n*), for example, may be configured to operate as virtual instances on the same physical machine. In other words, one or more of the QDRIC device 202, the server devices 204(1)-204(*n*), or the client devices 208(1)-208(*n*) may operate on the same physical device rather than as separate devices communicating through communication network(s) 210. Additionally, there may be more or fewer QDRIC devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
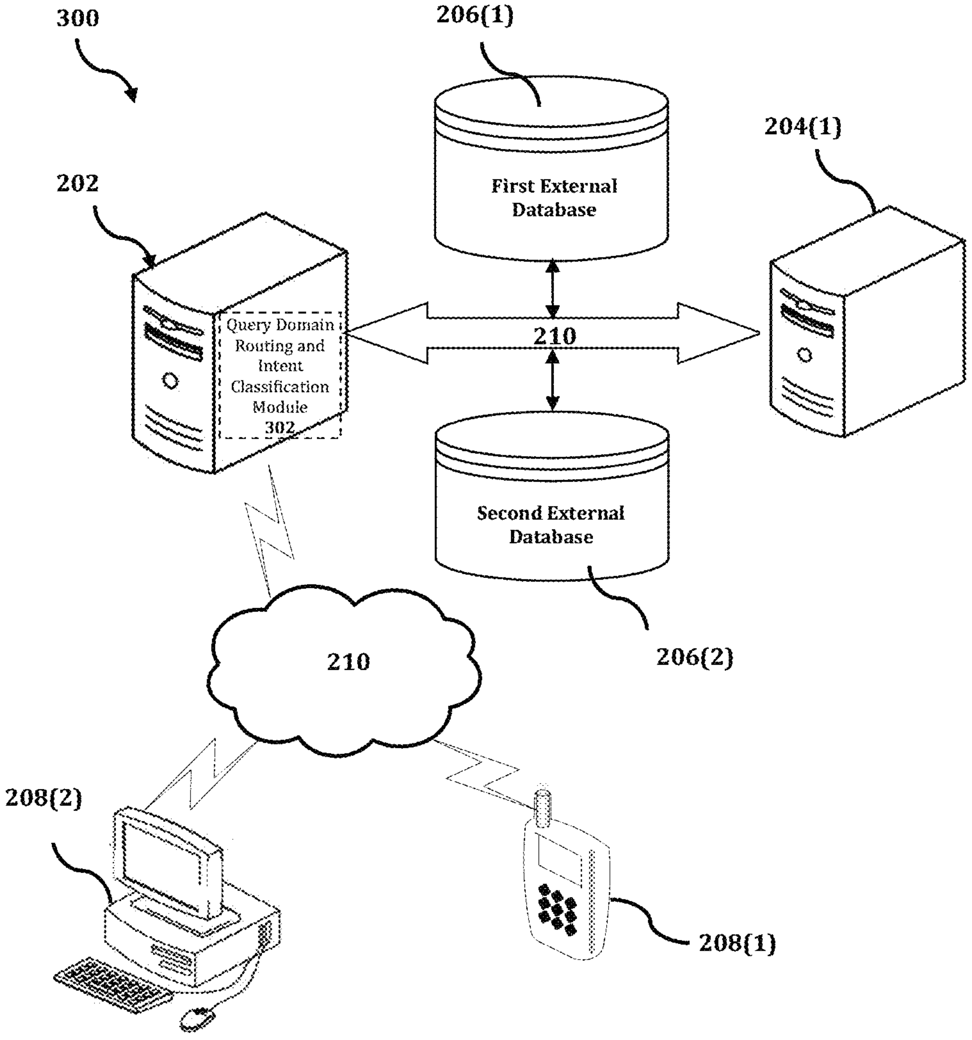
FIG. 3 shows an exemplary system for implementing a method for performing hierarchical domain routing and intent classification on user queries in order to improve accuracy in responding to such queries and to create smoother conversations between virtual voice assistants and users.

The QDRIC device 202 is described and shown in FIG. 3 as including a query domain routing and intent classification module 302, although it may include other rules, policies, modules, databases, or applications, for example. As will be described below, the query domain routing and intent classification module 302 is configured to implement a method for performing hierarchical domain routing and intent classification on user queries in order to improve accuracy in responding to such queries and to create smoother conversations between virtual voice assistants and users in an automated, efficient, scalable, and reliable manner.

An exemplary process 300 for implementing a method for performing hierarchical domain routing and intent classification on user queries in order to improve accuracy in responding to such queries and to create smoother conversations between virtual voice assistants and users by utilizing the network environment of FIG. 2 is shown as being executed in FIG. 3. Specifically, a first client device 208(1) and a second client device 208(2) are illustrated as being in communication with QDRIC device 202. In this regard, the first client device 208(1) and the second client device 208(2) may be "clients" of the QDRIC device 202 and are described herein as such. Nevertheless, it is to be known and understood that the first client device 208(1) and/or the second client device 208(2) need not necessarily be "clients" of the QDRIC device 202, or any entity described in association therewith herein. Any additional or alternative relationship may exist between either or both of the first client device 208(1) and the second client device 208(2) and the QDRIC device 202, or no relationship may exist.

Further, QDRIC device 202 is illustrated as being able to access a first external database 206(1) and a second external database 206(2). The query domain routing and intent classification module 302 may be configured to access these databases for implementing a method for performing hierarchical domain routing and intent classification on user queries in order to improve accuracy in responding to such queries and to create smoother conversations between virtual voice assistants and users.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the QDRIC device 202 via broadband or cellular communication. Of course, these embodiments are merely exemplary and are not limiting or exhaustive.

Upon being started, the query domain routing and intent classification module 302 executes a process for performing hierarchical domain routing and intent classification on user queries in order to improve accuracy in responding to such queries and to create smoother conversations between virtual assistants and users. An exemplary process for performing hierarchical domain routing and intent classification on user queries in order to improve accuracy in responding to such queries and to create smoother conversations between virtual assistants and users is generally indicated at flowchart 400 in FIG. 4.

Figure 4:
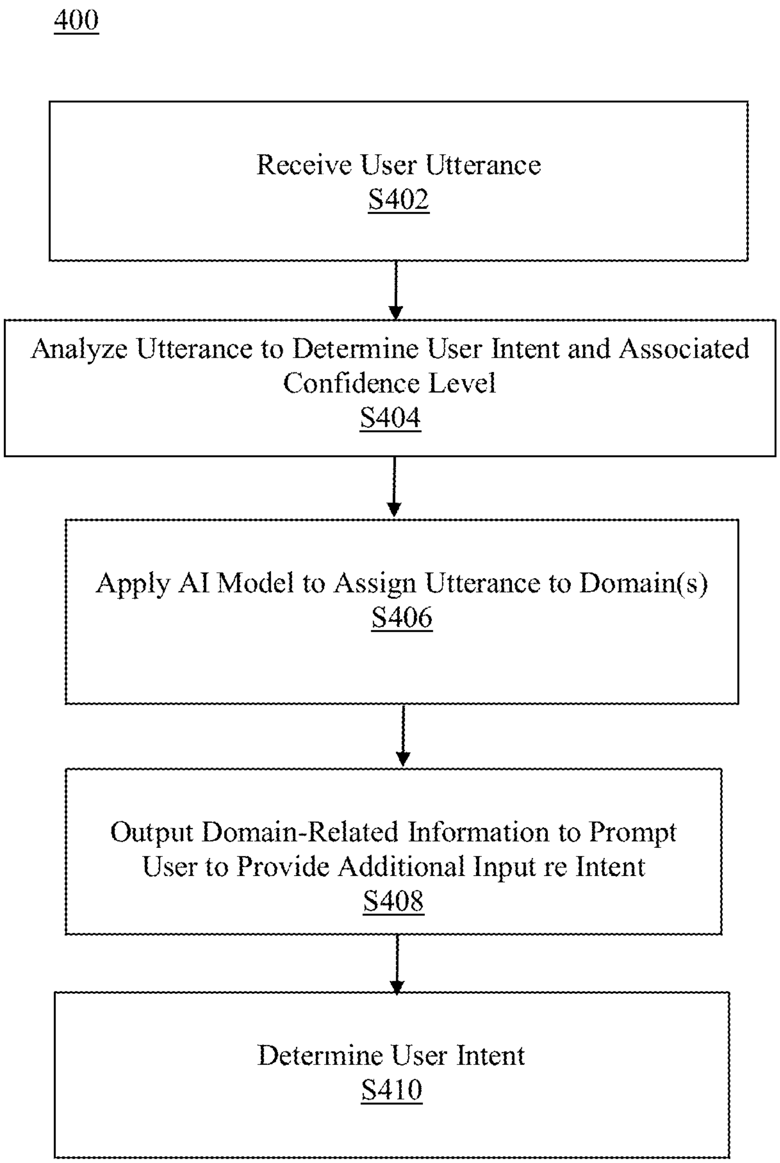
FIG. 4 is a flowchart of an exemplary process for implementing a method for performing hierarchical domain routing and intent classification on user queries in order to improve accuracy in responding to such queries and to create smoother conversations between virtual voice assistants and users.

In the process 400 of FIG. 4, at step S402, the query domain routing and intent classification module 302 receives an utterance from a user. In an exemplary embodiment, the utterance includes a user query that is expressed by text using natural language in a conversational mode.

At step S404, the query domain routing and intent classification module 302 analyzes the received utterance in order to make an initial determination of an intent of the user and a confidence level that relates to initial determination of the user intent. When the confidence level is sufficiently high, the virtual assistant may proceed to respond to the query based on the initial determination of the user intent.

At step S406, when the confidence level is less than a predetermined threshold, the query domain routing and intent classification module 302 applies, to the received utterance, an artificial intelligence (AI) model that is configured to assign the received utterance to at least one domain from among a predetermined set of domains. In an exemplary embodiment, the predetermined set of domains may include a first domain group that relates to products associated with a financial institution and a second domain group that relates to activity associated with the financial institution. However, the predetermined set of domains is not limited to these domain groups, and additional domain groups may also be included.

In an exemplary embodiment, the first domain group that relates to products associated with the financial institution may include any one or more of a first product domain that relates to Zelle®, a second product domain that relates to a bill payment product, a third product domain that relates to a deposit making product, a fourth product domain that relates to a car, and a fifth product domain that relates to a wire transfer product. In an exemplary embodiment, the second domain group that relates to activity associated with the financial institution may include any one or more of a first activity domain that relates to a money transfer activity, a second activity domain that relates to a payee management activity, and a third activity domain that relates to a transaction tracking activity. However, the predetermined set of domains is not limited to these domains, and additional domains may also be included.

At step S408, the query domain routing and intent classification module 302 outputs domain-related information that prompts the user to provide additional input that is usable for more reliably determining the intent of the user. In an exemplary embodiment, the outputting may include displaying, to the user, a predetermined list of items that corresponds to possible intentions associated with the domain(s) to which the utterance has been assigned, together with a prompt that acts as an invitation to the user to provide a response by which one or more of the possible intentions is selected by the user. In an exemplary embodiment, the outputting may include providing a question for which a user response would be indicative of the intent of the user. Then, at step S410, the query domain routing and intent classification module 302 receives the additional input from the user and makes a final determination of the user intent based on the additional input.

In an exemplary embodiment, the AI model is trained by using historical utterance data that is augmented by using any one or more of several techniques. One technique for augmenting the historical utterance data is a keyboard perturbation technique by which a particular utterance is altered by randomly replacing characters with words with neighboring characters on a keyboard. A second technique for augmenting the historical utterance data is a swapping character perturbation technique by which a particular utterance is altered by randomly swapping characters within a word while maintaining word length. A third technique for augmenting the historical utterance data is a back-translation technique by which a particular utterance is translated from English to a second language, such as French or German, and then the once-translated version of the utterance is translated back into English. A fourth technique for augmenting the historical utterance data is a paraphrasing technique by which a particular utterance is used for generating an additional example utterance that is different from the particular utterance but still maintains an original intent that is associated with the particular utterance, i.e., saying the same thing while using a different set of words to do so.

Dialogue systems in the real world often need to support a multitude of skills and user intents to add tangible business value and for users to be motivated to user them. With large numbers of intents in virtual assistants (VAs), two problems tend to occur: 1) a user does not know all skills and intents that a VA can recognize, and thus the user might start with a vague generic utterance and hope that the VA will either directly understand or guide the user by asking clarifying questions and guide the user down to the right path; and/or 2) some intents might have more subtle differences, and user utterances may become ambiguous as between two or more distinct intents. In such a situation, a VA might say that it does not understand the user query and ask to completely rephrase the user question or query, without expressing how to rephrase or which part was unclear, thus often leading to a frustrating user experience. In this aspect, the user experience would be improved if the VA could respond with a more targeted response, at least showing that the VA understands the general idea of the query, but needs more information to drill down to the exact user intent. In an exemplary embodiment, the present inventive concept provides a method that is implemented in a Natural Language Understanding (NLU) component of a pipeline-based task oriented agent, where the method is designed to gracefully handle such cases in order to make smoother conversations between digital assistants and customers. The present inventive concept also provides a template-based approach to facilitate conversion of business logic into training data, and to generate synthetic training data for the dialogue manager for machine learning (ML)-based policy learning without prior conversational data.

In an exemplary embodiment, a dialogue system will likely see a large amount of out-of-scope and generic utterances that cannot be labeled into any of an existing set of intents because customers generally do not have knowledge of that existing set of intents. In order to improve the customer experience, the present inventive concept is designed to provide a conditional bottom-up hierarchical NLU model which can always provide some form of an answer to a user's original question, either in the form of an in-domain frequently asked question (FAQ) or explaining the possible intents to the user within the relevant domain.

The main function of NLU components in VAs is to return the intent of the last user utterance and extract any slots and/or entities that are present. Intent classification is performed by using text classification models and slot tagging via token classification. Separate models can be used for each task, but significant benefits may be realized when utilizing a single model that is trained jointly using multi-task learning due to the typically positive transfer of these two tasks.

Flat Slot Intent Model: In an exemplary embodiment, a slot intent model is based on a dual intent entity transformer (DIET) model which uses a transformer architecture supplemented with a Conditional Random Field (CRF) to help improve the performance on slot tagging, as compared with simply using the output hidden states of a transformer Additionally, the DIET model also supplements the intent prediction and entity losses with masked language modeling loss, which generally further improves performance, especially on domains that are different from the ones on which the dense featurizer is pre-trained.

This approach of using a flat joint slot intent model performs well when dealing with a relatively small list of intents and limited users who have knowledge of the domains and intents of the VA. However, this is typically not the case. Enterprise scale VAs must support total intents numbering in the hundreds or thousands over time. Naturally, as users learn of the bot being capable of more intents, they are inclined to ask question which end up being either ambiguous, i.e., resolvable to multiple closely related intents, or out-of-scope for the VA. A simple approach for the out-of-scope handling is to have a separate class for such handling. In practice, this design leads to the out-of-scope intent being triggered often, with users repeatedly being asked to re-frame their questions without guidance, thus leading to a frustrating user experience.

Figure 5:
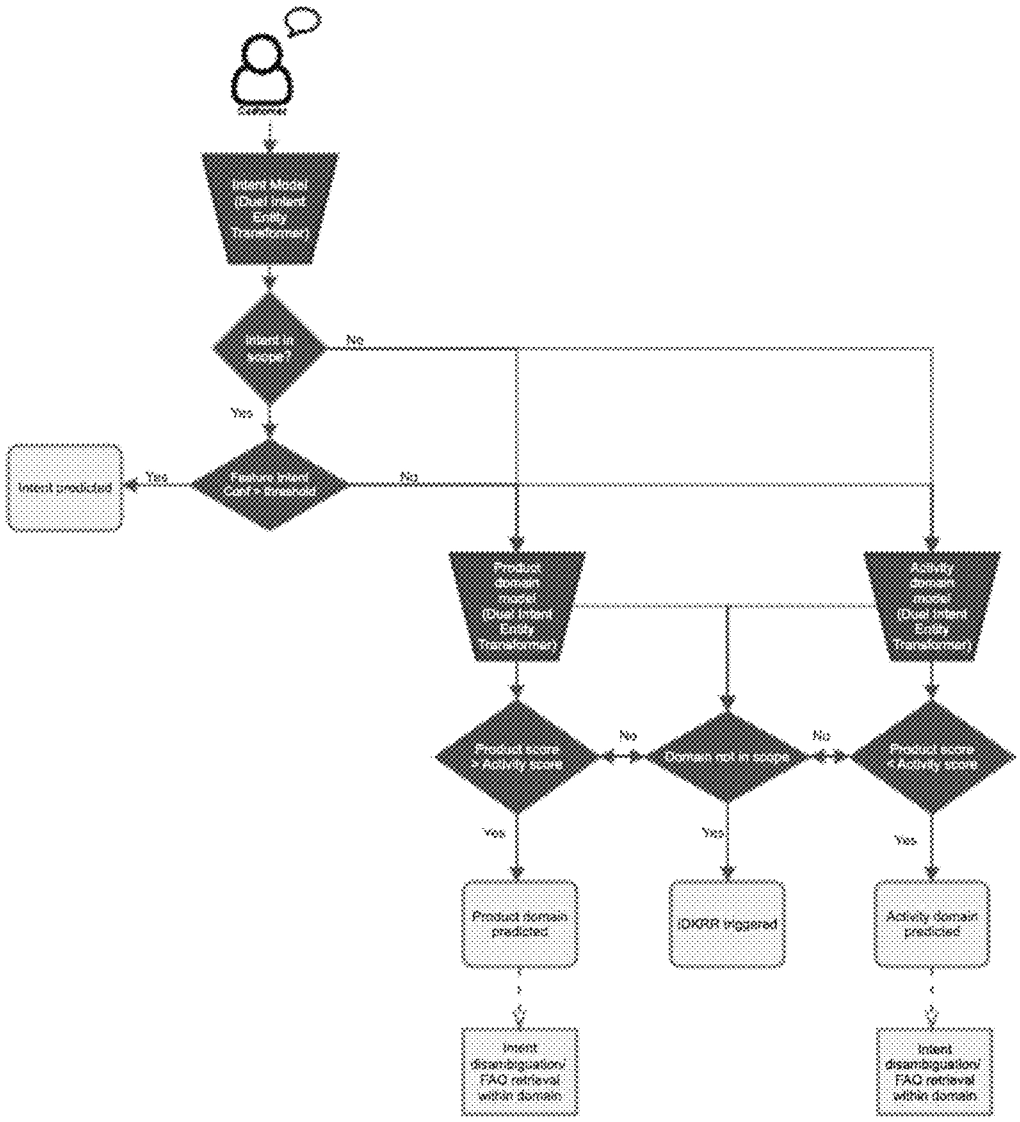
FIG. 5 is a diagram that illustrates a hierarchical ontology of a method for performing hierarchical domain routing and intent classification on user queries in order to improve accuracy in responding to such queries and to create smoother conversations between virtual voice assistants and users, according to an exemplary embodiment.

Hierarchical-Conditional Routing Model: To mitigate the above problem of ambiguous/vague utterance handling, the ontology of intents is organized into a hierarchical taxonomy where domains are defined as higher order abstractions, such as, for example, product areas or activity types; and intents are lower level actionable capabilities of the VA. FIG. 5 is a diagram 500 that illustrates hierarchical ontology of a method for performing hierarchical domain routing and intent classification on user queries in order to improve accuracy in responding to such queries and to create smoother conversations between virtual voice assistants and users, according to an exemplary embodiment.

At the inference time, the logic is as follows: 1) Run inference on the user utterance using the intent prediction model. 2) If the predicted intent is not deemed out-of-scope and predicts an intent with high confidence, then the predicted intent is returned without triggering the domain model. 3) However, if the intent is deemed as being out-of-scope or has low confidence, then one or more domain classification models will be triggered to recognize the higher level domain(s) to which that utterance might belong. 4) If the domain classification model predicts a domain with sufficiently high confidence, then the agent provides the user with intents and/or actions within the domain for disambiguation. 5) If there are more than one domain taxonomies and more than one domain models are triggered, then tie-breaking logic is applied between domain routing models to select the taxonomy prediction which is most relevant to the user utterance. 6) Then, if the domain classifier is also not able to detect a domain with sufficient confidence, then a retrieval of top-K frequently asked questions (FAQs) is made from an FAQ database. This Question/Answer pair either answers the user's question completely or at least lets the user know some more incrementally relevant information. 7) Finally, if none of the domain models or the FAQ retrieval is sufficiently confident, which is significantly rarer than for intents, then the user is asked to re-frame the utterance.

This approach significantly minimizes the frequency of asking the user to re-frame their utterance without any guided context. The domain models can follow multiple orthogonal ontologies and/or taxonomies, i.e., mappings of intents to domains, and themselves are trained by using not only intent utterances, with intent labels mapped to higher level domain classes, but also by using some more generic and/or vague utterances that are not used for intent model training. In this aspect, utterances which are out-of-domain for a flat intent model could be in-domain for a domain model. For example, a user might ask about a supported product but inquire about an unsupported intent and/or action with respect to that product.

Figure 6:
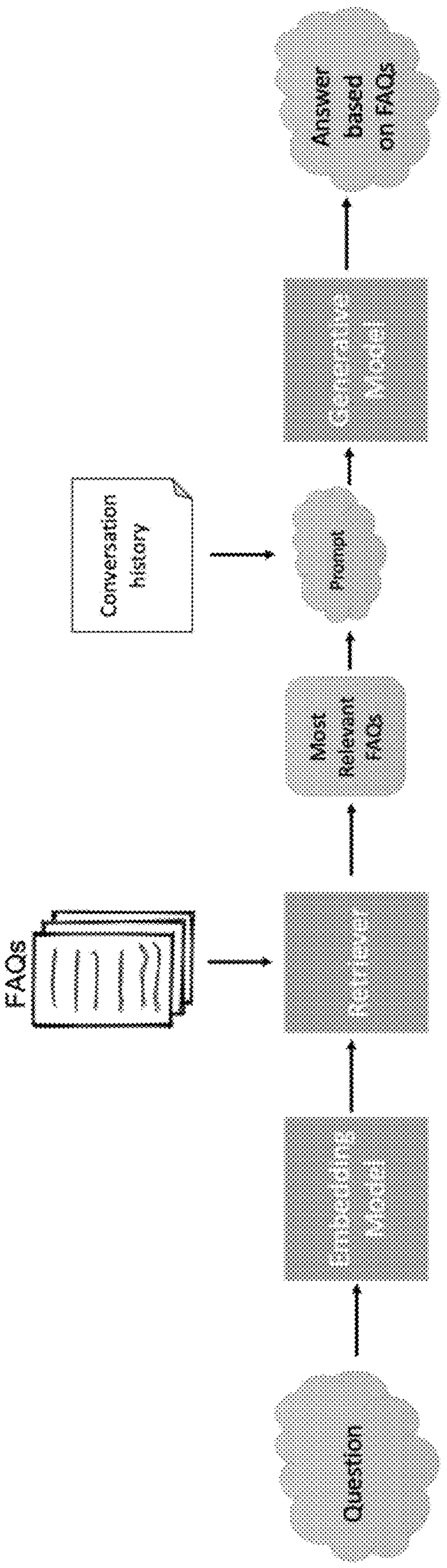
FIG. 6 is a diagram that illustrates a question answering pipeline that is usable in a method for performing hierarchical domain routing and intent classification on user queries in order to improve accuracy in responding to such queries and to create smoother conversations between virtual voice assistants and users, according to an exemplary embodiment.

FAQs Retrieval and Question-Answer with Large Language Models: In an exemplary embodiment, to further reduce the frequency of fallback answers that prompt users to rephrase their queries, an implementation has been made of a proof of concept of contextual question-answering (QA) system that leverages the conversation history, an FAQs knowledge base, and Large Language Models (LLMs). FIG. 6 is a diagram 600 that illustrates a question answering pipeline that is usable in a method for performing hierarchical domain routing and intent classification on user queries in order to improve accuracy in responding to such queries and to create smoother conversations between virtual assistants and users, according to an exemplary embodiment.

Following the classification process by both intent and domain models, utterances that are identified as being out-of-scope are directed to an LLM-powered conversational QA system. A knowledge base of FAQs and their corresponding answers has been curated. All FAQs are initially indexed as dense embedding vectors using an embedding model. At inference time, the incoming query is encoded using the same embeddings model, and then the most similar FAQ questions are retrieved, based on cosine similarity. To provide contextual answers, the answers are not directly presented in the retrieved FAQs to the user; instead, a prompt is constructed to instruct the LLM to utilize the top-k most relevant FAQ answers, together with the available conversation history, to generate appropriate responses to user questions.

Dialogue manager: In an exemplary embodiment, a task-oriented dialogue system is constructed, and as such, conversation is used to guide a user through different journeys based on the user's intent to complete different tasks. As customer journeys often need to follow pre-defined business logic, the primary goal of dialogue management is to ensure conversation turns stay within the boundary of business rules, if possible. However, this is not always feasible, and the VA needs the intelligence to handle unexpected conversation turns and still take the appropriate action.

To achieve these goals, advantageous use is made of a hybrid solution with two components-a rule-based component and a machine learning-based component. For the rule-based component, a next action is determined by a combination of a current state and the previous N states, where state is defined as a combination of intent, action, and values of different state variables. Key value pairs of all state-to-action mappings are extracted from dialogue training data, i.e., conversation stories, and stored in a hash table, which is then used to retrieve an action at inference time. Conversation stories that lead to key collisions are excluded in construction of the hash table.

For the machine learning-based component a Transformer Embedding Dialogue (TED) model is trained to handle conversations that are not covered by the rule-based component. The inputs of the TED model include user utterance, together with parsed intent and entity, history of actions, and current slot values, i.e., state variables. Inputs are passed through transformers to generate an embedding. A similarity score is calculated by using the embedding to rank all possible actions. The top-ranked action is then selected as a prediction for the next action.

Accordingly, with this technology, an optimized process for performing hierarchical domain routing and intent classification on user queries in order to improve accuracy in responding to such queries and to create smoother conversations between virtual voice assistants and users is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for using a virtual assistant to respond to a request of a user, the method being implemented by at least one processor, the method comprising:

receiving, by the at least one processor, an utterance from the user;

analyzing, by the at least one processor, the received utterance in order to make an initial determination of an intent of the user and a confidence level that relates to the initial determination of the intent;

when the confidence level is less than a predetermined threshold, applying, to the received utterance by the at least one processor, an artificial intelligence (AI) model that is configured to assign the received utterance to at least one domain from among a predetermined plurality of domains;

outputting, by the at least one processor based on the at least one domain to which the received utterance is assigned, information that prompts the user to provide additional input that relates to the intent of the user;

receiving, by the at least one processor from the user, the additional input; and secondarily determining, by the at least one processor based on the additional input, the intent of the user, wherein the AI model is trained by using historical utterance data that is augmented by using a keyboard perturbation technique that relates to randomly replacing characters within words with neighboring characters on a keyboard, and wherein the AI model includes at least one from among a flat slot intent model, a hierarchical-conditional routing model, and a transformer embedding dialogue model.

2. The method of claim 1, wherein the outputting of the information comprises displaying, to the user, a respective predetermined list of items that corresponds to possible intentions associated with the at least one domain to which the received utterance is assigned.

3. The method of claim 1, wherein the predetermined plurality of domains includes a first domain group that relates to products associated with a financial institution and a second domain group that relates to activity associated with the financial institution.

4. The method of claim 3, wherein the first domain group includes a first domain that relates to Zelle®, a second domain that relates to a bill payment product, a third domain that relates to a deposit making product, a fourth domain that relates to a card, and a fifth domain that relates to a wire transfer product.

5. The method of claim 3, wherein the second domain group includes a sixth domain that relates to a money transfer activity, a seventh domain that relates to a payee management activity, and an eighth domain that relates to a transaction tracking activity.

6. The method of claim 1, wherein the AI model is further trained by using the historical utterance data that is further augmented by using a swapping character perturbation technique that relates to randomly swapping characters within a word while maintaining word length.

7. The method of claim 1, wherein the AI model is further trained by using the historical utterance data that is further augmented by using a back-translation process that relates to translating a respective utterance from English to at least one from among French and German and then translating the translated respective utterance back to English.

8. The method of claim 1, wherein the AI model is further trained by using the historical utterance data that is further augmented by using a paraphrasing process that relates to generating, for a respective utterance, at least one additional example utterance that is different from the respective utterance while maintaining an original intent that is associated with the respective utterance.

9. A computing apparatus for using a virtual assistant to respond to a request of a user, the computing apparatus comprising:

a processor;

a memory; and a communication interface coupled to each of the processor and the memory, wherein the processor is configured to:

receive, via the communication interface, an utterance from the user;

analyze the received utterance in order to make an initial determination of an intent of the user and a confidence level that relates to the initial determination of the intent;

when the confidence level is less than a predetermined threshold, apply, to the received utterance, an artificial intelligence (AI) model that is configured to assign the received utterance to at least one domain from among a predetermined plurality of domains;

output, based on the at least one domain to which the received utterance is assigned, first information that prompts the user to provide additional input that relates to the intent of the user;

receive, from the user via the communication interface, the additional input; and secondarily determine, based on the additional input, the intent of the user, wherein the AI model is trained by using historical utterance data that is augmented by using a keyboard perturbation technique that relates to randomly replacing characters within words with neighboring characters on a keyboard, and wherein the AI model includes at least one from among a flat slot intent model, a hierarchical-conditional routing model, and a transformer embedding dialogue model.

10. The computing apparatus of claim 9, wherein the processor is further configured to perform the outputting of the information by displaying, to the user, a respective predetermined list of items that corresponds to possible intentions associated with the at least one domain to which the received utterance is assigned.

11. The computing apparatus of claim 9, wherein the predetermined plurality of domains includes a first domain group that relates to products associated with a financial institution and a second domain group that relates to activity associated with the financial institution.

12. The computing apparatus of claim 11, wherein the first domain group includes a first domain that relates to Zelle®, a second domain that relates to a bill payment product, a third domain that relates to a deposit making product, a fourth domain that relates to a card, and a fifth domain that relates to a wire transfer product.

13. The computing apparatus of claim 11, wherein the second domain group includes a sixth domain that relates to a money transfer activity, a seventh domain that relates to a payee management activity, and an eighth domain that relates to a transaction tracking activity.

14. The computing apparatus of claim 9, wherein the AI model is further trained by using the historical utterance data that is further augmented by using a swapping character perturbation technique that relates to randomly swapping characters within a word while maintaining word length.

15. The computing apparatus of claim 9, wherein the AI model is further trained by using the historical utterance data that is further augmented by using a back-translation process that relates to translating a respective utterance from English to at least one from among French and German and then translating the translated respective utterance back to English.

16. The computing apparatus of claim 9, wherein the AI model is further trained by using the historical utterance data that is further augmented by using a paraphrasing process that relates to generating, for a respective utterance, at least one additional example utterance that is different from the respective utterance while maintaining an original intent that is associated with the respective utterance.

17. A non-transitory computer readable storage medium storing instructions for using a virtual assistant to respond to a request of a user, the storage medium comprising executable code which, when executed by a processor, causes the processor to:

receive an utterance from the user;

analyze the received utterance in order to make an initial determination of an intent of the user and a confidence level that relates to the initial determination of the intent;

when the confidence level is less than a predetermined threshold, apply, to the received utterance, an artificial intelligence (AI) model that is configured to assign the received utterance to at least one domain from among a predetermined plurality of domains;

output, based on the at least one domain to which the received utterance is assigned, information that prompts the user to provide additional input that relates to the intent of the user;

receive, from the user, the additional input; and secondarily determine, based on the additional input, the intent of the user, wherein the AI model is trained by using historical utterance data that is augmented by using a keyboard perturbation technique that relates to randomly replacing characters within words with neighboring characters on a keyboard, and wherein the AI model includes at least one from among a flat slot intent model, a hierarchical-conditional routing model, and a transformer embedding dialogue model.

18. The storage medium of claim 17, wherein when executed, the executable code further causes the processor to display, to the user, a respective predetermined list of items that corresponds to possible intentions associated with the at least one domain to which the received utterance is assigned.

* * * * *